March 24, 1931.　　　E. F. WATERBOR　　　1,797,304
VEHICLE WHEEL
Filed March 17, 1927　　2 Sheets-Sheet 1
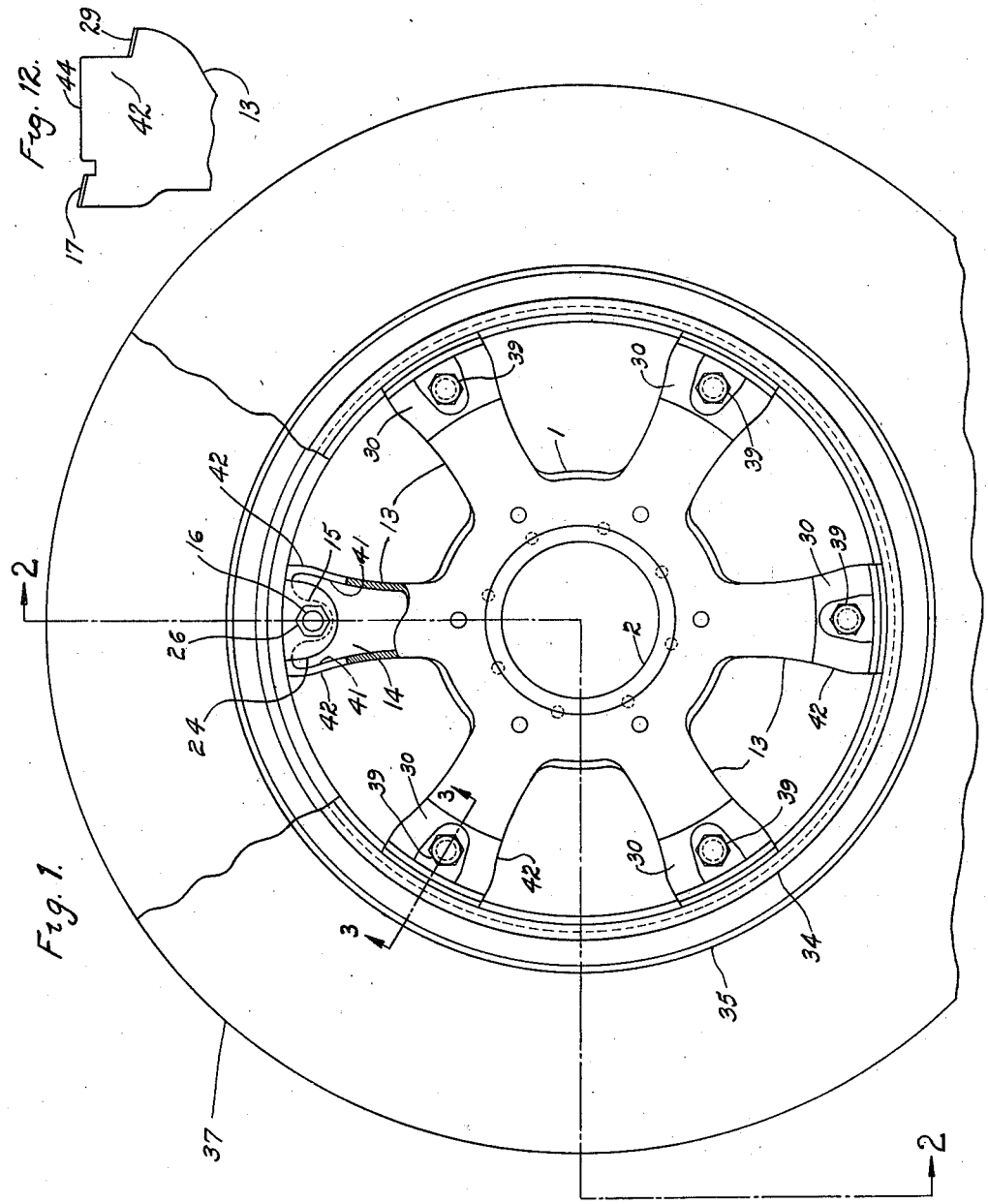
Elmer F. Waterbor
INVENTOR
BY
Geo. B. Ingersoll
ATTORNEY

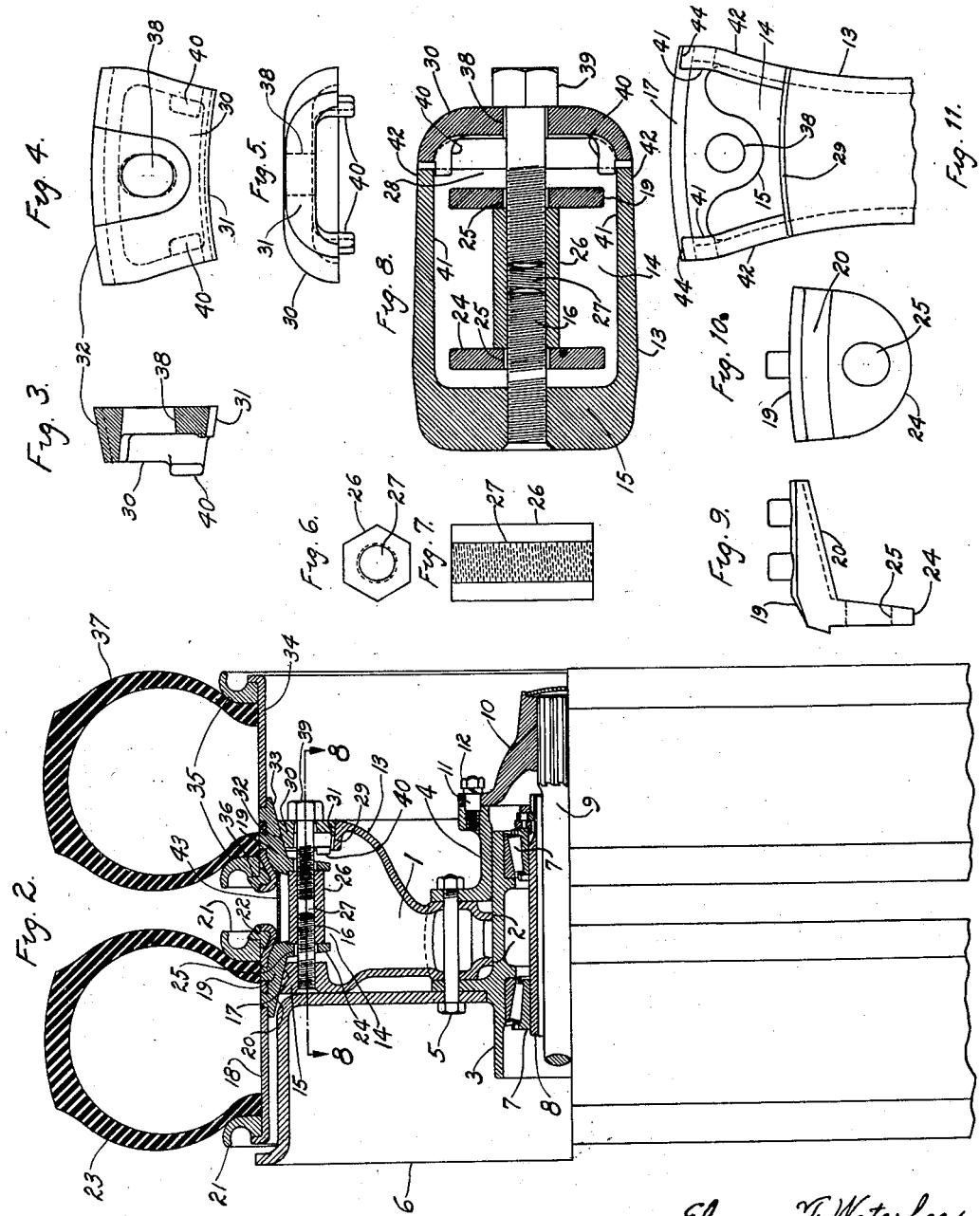

Patented Mar. 24, 1931

1,797,304

UNITED STATES PATENT OFFICE

ELMER F. WATERBOR, OF DETROIT, MICHIGAN, ASSIGNOR TO CHRISTINE McDONALD SIMPSON, OF DETROIT, MICHIGAN

VEHICLE WHEEL

Application filed March 17, 1927. Serial No. 176,156.

My invention relates to improvements in cast vehicle-wheels as used on motor vehicles and particularly to wheels for the installation of dual tires; and the objects of my improvements are, first, to provide a wheel adapted to the installation of dual tires, that will be approximately as light in weight as single tire wheels; second, to provide a wheel adapted to dual tire installation that will present an appearance of a single wheel; third, to afford the facilities for the installation of different sizes of tires with different center spacing without the necessity of changing wheels; fourth, to provide a wheel that will be capable of automatic self-alignment in the assembly of the inner rim, of a dual tire installation, on its supporting surfaces; fifth, to provide a dual tire wheel with a positive driving connection between both rim assemblies and each spoke of the wheel; and sixth, to provide a dual tire wheel having no felloe construction between its single spokes.

I attain these objects by the mechanism illustrated in the accompanying drawings, in which—

Figure 1 is a side elevation of the entire wheel, less hub and hub attaching parts, with dual tires assembled thereon; Fig. 2, a combined sectional view and end elevation of the wheel and tires on the line 2—2, Fig. 1; Fig. 3, a sectional view of the rim clamp on the line 3—3 of Fig. 1; Fig. 4, a side elevation of the rim clamp; Fig. 5, a bottom view of the rim clamp; Fig. 6, a plan view of the spacing and clamp nut; Fig. 7, a side elevation of the spacing and clamp nut; Fig. 8, a sectional view on the line 8—8, Fig. 2; Fig. 9, a side elevation of one of the rim lugs; Fig. 10, an end elevation of one of the rim lugs; Fig. 11, a side elevation of the end of one of the wheel spokes, without attaching parts; and Fig. 12, a front elevation of the end of one of the wheel spokes, without attaching parts.

Similar numerals refer to similar parts throughout the several views.

The wheel 1 has a hole 2 which fits on the hub 3 and is clamped thereon by the flange 4 and hub bolts 5, the hub bolts 5 also clamping the brake drum 6 to the hub 3. The hub 3 is shown mounted in the usual way, on the bearings 7 which in turn are mounted on the axle housing 8. The axle drive shaft 9 is splined, at its outer end, into the driving flange 10, which in turn is fastened to the flange 4 by means of the studs 11 and nut 12.

The wheel 1 has a plurality of hollow spokes 13 which terminate at their outer ends in an enlarged open chamber 14. The rear wall of the enlarged open chamber 14 has a tapped boss 15 into which is threaded the stud 16. At the rear of the enlarged open chamber 14 at the end of each spoke 13 is an angular surface 17 which is machined concentric with the hole 2. The inner rim base 18 has a plurality of lugs 19 which are suitably fastened to the rim base 18 in such manner as to allow a lug 19 to assemble at the outer end of each spoke 13. The lug 19 is shown in detail in Figs. 9 and 10, and has an angular surface 20 which can be clamped against the angular surface 17. The rim base 18 forms a support for the rim flanges 21, the lock ring 22, and the inner tire 23 as utilized in the ordinary pneumatic tire rim equipment assembly for motor vehicles.

The lug 19 has a flange 24 through which is machined the hole 25. When the angular surface of the lug 19 rests on the angular surface 17 of the wheel 1, the stud 16 is within the hole 25 of the lug 19. The hexagon nut 26 is shown in detail in the Figs. 6 and 7 and has a tapped hole 27 which fits over the stud 16 and enables the angular surface 20 of the lug 19, with its inner rim assembly, to be clamped to the angular surface 17 on the wheel 1.

The front wall of the enlarged open chamber 14 has an opening 28, at the bottom of which is an angular surface 29. The clamp 30, shown in detail in Figs. 3, 4, and 5, fits within the opening 28 and has a lower angular surface 31 which rests on the angular surface 29. The clamp 30 has an upper angular surface 32 which fits against the angular surface 33 of one of the lugs 19 which are suitably fastened to the outer rim base 34 which forms a support for the rim flanges 35, the lock rings 36, and the outer tire 37.

The clamp 30 has a hole 38 through which is assembled the screw 39, the said screw passing through the hole 25 in the lug 19 and threading into the tapped hole 27 of the hexagon nut 26. After the hexagon nut 26 is tightened on the stud 16, it not only clamps the inner rim assembly in its operating position but it also forms a spacer against which the outer rim assembly may be clamped by the screw 39, thus spacing the two rim assemblies at any desired distance. The clamp 30 also has lugs 40 which fit within the inside surfaces 41 of the side walls 42. The lug 19 assembled over the stud 16 affords a positive drive for the tractive reaction of the inner rim and tire assembly and the screw 39, extending through the clamp 30 and the lug 19 to the hexagon nut 26, together with the lugs 40 fitting within the surfaces 41 of the walls 42, afford a positive drive for outer rim and tire assembly.

The solid annular shield 43 is assembled between the rim base assemblies and is held in place by them, thus preventing mud, etc., from finding its way into the hollow ends of the spokes 1.

The outer end surfaces 44 of the spokes 1 are of slightly less diameter than the inside diameters of the rim bases 18. This allows the inner rim base to be placed by the operator, on the surfaces 44, when the complete rim and tire unit is being assembled. From this position it will be automatically guided to its seat on the angular surface 17 when the hexagon nut 26 is threaded along the stud 16.

I claim:

1. In a wheel structure, a hub, spokes radiating from the said hub, the said spokes having open ends at their outer extremities, inwardly inclined bearing surfaces on the said spokes, studs suitably fastened in the rear walls of and extending into the open ends of the said spokes, an inner rim having an inclined bearing surface contacting with the said inwardly inclined bearing surfaces the said inner rim being further provided with driving lugs the said driving lugs engaging the said studs, nuts adapted to screw on the said studs and clamp the said inner rim on the said inwardly inclined bearing surfaces, an outer rim having an inwardly inclined bearing surface and driving lugs contacting with the said nuts, outwardly inclined bearing surfaces, on the said spokes, a plurality of clamps having upper inwardly inclined bearing surfaces contacting with the inwardly inclined bearing surface on the said outer rim, the said clamps being further provided with lower outwardly inclined bearing surfaces, contacting with the said outwardly inclined bearing surfaces on the said spokes, and clamping screws adapted to engage the said nuts, the said clamping screws extending through the said clamps and the driving lugs on the said outer rim.

2. In a wheel structure, a hub, spokes radiating from the said hub, a pair of wheel rims mounted on the said spokes, means for clamping the inner of the said pair of wheel rims, the said means being adapted to space the outer of the said pair of wheel rims, a solid annular member encircling the said means for clamping the inner of the said pair of wheel rims, the said solid annular member being retained between and within the said pair of wheel rims, and means for clamping the outer of the said pair of wheel rims against the said means for clamping the inner of the said pair of wheel rims.

3. In a vehicle wheel, the combination of a hub, spokes radiating from the said hub, the said spokes terminating, at their outer ends, in open sections having front, rear, and side walls, inwardly inclined bearing surfaces on the rear walls of the said spokes, an inner rim mounted on the said inwardly inclined bearing surfaces, studs mounted in the rear walls of the said spokes, an outer rim, revolvable members mounted on the said studs, each of the said revolvable members having a single vertical surface contacting with the said inner rim and a single vertical surface contacting with the said outer rim, outwardly inclined bearing surfaces on the front walls of the said spokes, removable members interposed between the said outer rim and the said outwardly inclined bearing surfaces, the said removable members having lugs engaging the inside surfaces of the side walls of the said spokes, and means for forcing the said removable members into contact with the said outer rim, the said outer rim thereby being forced into contact with the said revolvable members.

4. In a vehicle wheel, the combination of a hub, spokes radiating from the said hub, wheel rims mounted on the said spokes, revolvable members spacing the said rims, rim supporting members each having a lower bearing surface contacting in a single plane with the said spokes and an upper bearing surface contacting in a single plane with one of the said rims, the said rim supporting members being further provided with lugs contacting with the inside walls of the said spokes, and means for maintaining the said rim supporting members in a constant vertical position, the said means having only vertical surfaces in contact with the said rim supporting members.

5. In a vehicle wheel, the combination of a pair of wheel rims mounted thereon, revolvable members for spacing the said pair of wheel rims in their mounted positions, and a solid annular member, the said solid annular member being retained by and completely enclosing the space between and within the said pair of wheel rims, the said annular member further enclosing the said revolvable member.

6. In a vehicle wheel, comprising a pair of wheel rims, revolvable spacers mounted between the said rims, rim clamps, each having an upper inwardly inclined bearing surface contacting in a single plane with the outer of the said rims and a lower outwardly inclined bearing surface contacting in a single plane with the said vehicle wheel, the said rim clamps each being further provided with a clamping bolt hole between the said upper and the said lower inclined bearing surfaces together with lugs for engaging portions of the said vehicle wheel, and members for forcing the said rim clamps inwardly, the said members being operatively connected, through the outer of the said pair of wheel rims and the said rim clamps.

7. In a vehicle wheel, the combination of a hub, spokes radiating from the said hub, the said spokes having front walls terminating below its remaining walls, outwardly inclined bearing surfaces on the front walls of the said spokes, a pair of wheel rims, each of the said wheel rims having, on its base, supporting surfaces lying in a single plane, revolvable members for spacing the said pair of wheel rims, rim clamps, each of the said rim clamps having an upper inwardly inclined bearing surface contacting in a single plane with the base of the outer of the said pair of wheel rims and a lower outwardly inclined bearing surface contacting in a single plane with the said outwardly inclined bearing surfaces on the front walls of the said spokes, each of the said rim clamps being further provided with lugs to engage the walls of the said spokes, and bolts for forcing the said rim clamps against the base of the outer of the said pair of wheel rims and the said outwardly inclined bearing surfaces on the front walls of the said spokes, the said bolts engaging the said revolvable members through the said rim clamps in a plane lying between the upper and lower inclined surfaces on the said rim clamps.

ELMER F. WATERBOR.